United States Patent

Doring

[15] 3,702,032
[45] Nov. 7, 1972

[54] SOUND CARRIER AND REPRODUCING DEVICE FOR USE WITH INSTRUCTION BOOKS AND THE LIKE

[72] Inventor: Erich Doring, La-Punt/Chamues-Ch 96, Switzerland

[22] Filed: Jan. 13, 1971

[21] Appl. No.: 106,201

[30] Foreign Application Priority Data

Jan. 13, 1970 Germany..........P 20 01 283.3

[52] U.S. Cl. ..................................35/8 A, 274/42 R
[51] Int. Cl. ............................G09b 1/06, G11b 3/68
[58] Field of Search .....35/8 A, 35 C; 40/125 A, 340; 274/42 R, 42 P, 43

[56] References Cited

UNITED STATES PATENTS

| | | | |
|---|---|---|---|
| 2,936,342 | 5/1960 | Kallmann | 35/35 C X |
| 2,822,425 | 2/1958 | Hicks | 35/8 A X |
| 3,461,583 | 8/1969 | Buck | 40/125 A |

FOREIGN PATENTS OR APPLICATIONS

| | | | |
|---|---|---|---|
| 341,146 | 1/1931 | Great Britain | 35/8 A |
| 860,111 | 2/1961 | Great Britain | 274/42 R |

Primary Examiner—Wm. H. Grieb
Attorney—Brenner, O'Brien, Guay & Connors

[57] ABSTRACT

A sound carrier is affixed where desired by the user onto a printed page of a book or the like and a sound reproducing unit is operatively engaged with the sound carrier by the user through the medium of visually locatable positioning means cooperatively carried by the sound carrier and the reproducing unit.

2 Claims, 3 Drawing Figures

PATENTED NOV 7 1972

3,702,032

INVENTOR
Erich Döring
BY
Brenner, O'Brien, Day & Connors
Attorneys

SOUND CARRIER AND REPRODUCING DEVICE FOR USE WITH INSTRUCTION BOOKS AND THE LIKE

In the educational field, especially in the case of self-tutoring, it frequently is desirable or even necessary to supplement visual material, such as represented by pictures or words, by aural information and to emphasize such material with aural type sounds in that manner. For this purpose it is customary, for example, to associate records or tapes with books used in self-tutoring, and for the user to listen to such records or tapes in accordance with a prescribed plan following step by step with the contents of the books.

The relatively complicated handling of loose disc recordings and tapes, and particularly the playing of these sound carriers, coordinated with the progressive reading and studying of a book, cannot be expected from more youthful pupils, especially children who are learning to read at a preschool age and where the motivation for studying is not very strong. In addition, in many cases, the coordination of a certain record with a certain passage of the text or page in the book is almost impossible for children of preschool age.

Therefore, it frequently has been necessary to omit a supplementation of the pictorial and written presentation by aural information or to arrange for an adult to present the aural information which entailed an undesirable influencing of the still playful learning process of the child.

Consequently, the proposal has been made to provide, as a recording surface, a small surface with spiral sound tracks. The sound tracks are played with small sound reproducing devices that can be placed on the sound tracks and which have a turning scanning head for following the sound tracks. Books are provided with such fixed recording surfaces but they are relatively expensive because printed pages of text provided with sound tracks are expensive to produce. Further, it is not possible for the purchaser to procure the books with sound recording according to his own choice, especially only partial recordings.

The object of the present invention is the provision of a sound carrier, the playing of which is coordinated with the text of a book or some other written publication and which can be played by an inexperienced child not accustomed to proceeding by plan without the assistance of a grown-up person and which makes possible the sound recording of books and other publications according to free choice and the production of such type books at reasonable costs.

For these purposes and starting from a played-on sound carrier in the form of a flat plate or foil with a sound track on one side, in accordance with the invention the side of the sound carrier free of the sound track is coated with a self-adhesive coating and the sound carrier is provided with holes or cavities, for example, two at a distance from one another at one edge outside the area taken up by the sound track.

The self-adhesive coating is provided in order to be able to glue such sound carrier onto the page of a book or the page of other type texts. Thus, the coordination between the visual information contained on the page of the book and the aural information contained on the sound carrier will be assured in a most simple and safe manner. For example, the sound carriers for a book with which reading is to be learned may contain the text printed on its page in a spoken form. The sound carriers for a book may be supplied along with the book in a loose manner and may then be glued on by the purchaser himself at the places determined by him. The purchaser will determine the number of sound carriers which he buys and glues in and thus he will determine the purchase price he has to pay for one educational device. Production of the book is accomplished in the manner customary for books without sound recording. Also, the production of sound carriers according to the invention will not require any special machines and takes place separate from the requirements of book manufacture.

The playing of the sound carrier glued onto one page of the book is performed with the assistance of a reproduction device which is generally known per se, for example, from the U.S. Pat. No. 2,486,662 issued Nov. 1, 1949. The reproduction unit is placed above the sound carrier onto the page of the book on positioning or distancing feet. Subsequently a scanning head on the underside of the reproduction unit engages the pattern of the sound track on the sound carrier and, as a result of that, the recording will be made audible. Prerequisite for a perfect scanning of the sound track is a precise reproducible alignment of the reproducing unit above the glued on sound carrier. The alignment is accomplished in a simple manner with the help of the two holes in the sound carrier of the present invention in such a way that the two positioning or distancing pieces or feet of the reproducing unit are inserted into the two holes when placing said unit onto the page of the book, as a result of which a precisely defined alignment between the reproducing unit and the sound carrier will be achieved in the most simple manner. The holes are provided at the edge of the sound carrier outside the area occupied by the sound track, so that the insertion of the positioning pieces into the holes can be observed and easily carried out by the user. In the case of another arrangement of the holes, these holes necessarily will be covered up by the reproducing unit that is to be placed on and a precise insertion would have to be accomplished by "trial and the sense of touch," which will be much more difficult particularly for children than an insertion where the holes can be seen.

The sound carrier according to the invention can be glued on any portion of the page of a book. But it would be preferable to glue it on in the vicinity of the upper edge of the page, so that the writing on the page of the book will not be covered up as far as the reader is concerned by the superimposed reproducing unit. The edge of the sound carrier on which the two holes have been provided naturally should face the reader and, therefore, the lower edge of the page of the book.

In probably the simplest arrangement, the sound carrier has a sound groove running in the shape of a spiral, such as found in conventional disc records. The reproducing unit in that case has a sound pickup on the lower side which is driven on a circular path and which is simultaneously shiftable radially. However, other sound tracks, for example a magnetic track, can be provided.

If a spiral shaped sound groove has been provided on the sound carrier, then the latter will effectively have a third or spindle receiving hole in the center of the spiral shaped sound groove. In this case the sound carrier which has not been glued on can be listened to, for example, for testing purposes, just like a standard flat disc record and with the ordinary playback units. Naturally, in this case, the self-adhesive coating must be covered up. Effectively, this will be accomplished with the use of a protective film that can be pulled off.

For reasons of production, it has turned out to be particularly suitable to have a round sound carrier, which has a larger diameter (for example 20 mm) than its spiral shaped sound track. The two holes or cavities for the alignment of the playing unit on the front side of the sound carrier are located in the broad edge outside the sound track. The sound carrier has a center hole, as customary in the case of disc records, in the center of the sound track. In the case of this design of the sound carrier, it will be possible to use the methods customary for the production of records. After pressing of the sound track, it will merely be necessary to punch out the two holes or penetrations located on the edge.

But a sound carrier which has approximately the outline of a square and in which two adjoining corners have been considerably rounded, and where the two holes or recesses in the edge have been provided on the corners which have not been rounded, has also turned out to be advantageous. In that case the reproducing unit is provided with four positioning or distancing feet and is placed onto the page of the book in a manner so that two feet are inserted into the holes on the edge and the two other feet are placed beside the rounded corners outside the sound carrier onto the page of the book. Although a good positioning of the page of the book and the sound carrier below the reproducing unit will be assured by the four positioning or distancing feet, it will not be necessary in the case of this design to insert more than the necessary two distancing feet in holes in the sound carrier.

Beside the straight edge, one can also provide two other holes for engagement by holders. As a result of that, the sound carrier can be filed in order in ring-type binders and can be presented in order for selection either in a store or by a representative.

The invention is set forth in more detail in the following with reference to the accompany drawing wherein an embodiment is illustrated by way of example and wherein.

Figure 1:
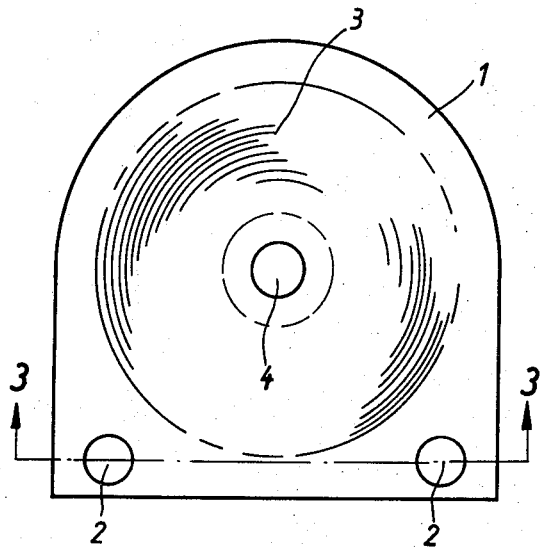
FIG. 1 is a diagrammatic top view of a sound carrier according to the invention.

The sound carrier 1, as exemplarily illustrated in the drawing, is shown made of a flat plate or thin foil, for example from plastic, and it has a basically square outline. However, at one end two opposite corners have been rounded to make an approximately semicircular or arcuate end edge. At the other straight side edge, there are two corners in each of which a hole 2 has been provided, the diameter of which in the case of an actual design amounts to, for example, 8 mm. The holes 2 are located outside an area which is occupied by the spiral sound groove 3 impressed on the front face or side of the sound carrier as visible in FIG. 1. The sound groove has been formed exactly as in the case of customary disc type records. In the center of the spiral shaped sound groove, the sound carrier has a third hole 4, whose diameter is equal to the diameter of the customary spindle receiving center holes in disc type records. On the rear face of side, the sound carrier 1 has been provided with a self-adhesive coating which is covered over by a removable protective sheet or film (not shown).

Figure 2:
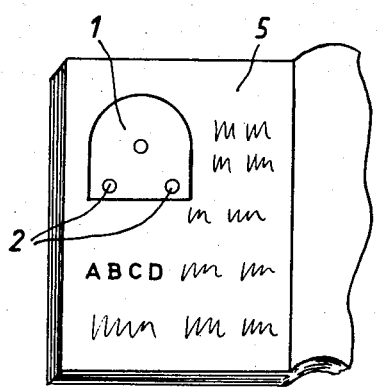
FIG. 2 is a perspective view showing the sound carrier glued onto a page of the book, and, FIG. 3 is a cross-section taken along the line 3—3 in FIG. 1 with a schematically indicated reproduction unit shown in position above the sound carrier.
Figure 3:
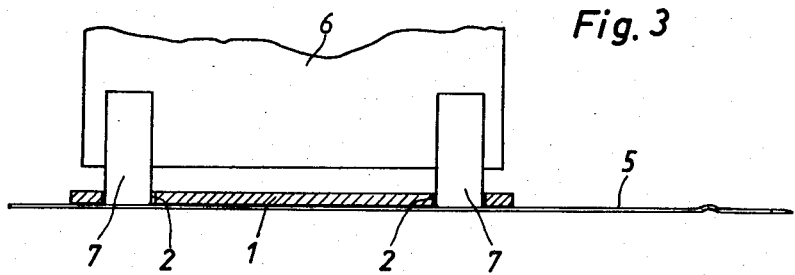

FIG. 2 shows schematically the sound carrier 1 with such foil removed and the carrier glued onto a page 5 of a book. The sound carrier has been glued on in the vicinity of the upper edge of the page of the book in such a manner that said straight side edge, having the holes 2, faces the lower edge of the page of the book. A reproduction unit 6 provided for the scanning of the glued on sound carrier is placed above the sound carrier 1 on page 5 of the book and is provided, in accordance with the invention, with four positioning or distancing feet 7. As shown in FIG. 3, two of the distancing feet are inserted into the holes 2, while the two additional distancing feet rest on the side of the book outside the sound carrier beside its rounded edges on the opposite side of the reproducing unit.

What is claimed is:

1. A sound carrier for selective affixation onto the page of a book at any desired place thereon comprising a flat plate having opposing faces, one of said faces having a central area provided with a spiral sound track, and said other face having a self-adhesive coating for fixedly superimposing the plate on the page said coating being covered by a removable protective film and said plate having an edge portion disposed outside the central area and provided with laterally spaced apart vertical holes to receive spacer and positioning feet carried by a sound reproducing unit so as to locate the unit in proper playing position on the plate when the plate is fixed on a page of a book.

2. The invention of claim 1 wherein said edge portion of the plate is a straight edge and said plate has an opposing arcuate edge portion and said holes are provided in the straight edge portion adjacent the opposing corners thereof and said plate has a center hole within the central area and passing through the opposing faces.

* * * * *